United States Patent
Yamamura et al.

(10) Patent No.: US 10,469,531 B2
(45) Date of Patent: Nov. 5, 2019

(54) FRAUD DETECTION NETWORK SYSTEM AND FRAUD DETECTION METHOD

(71) Applicants: SecureBrain Corporation, Tokyo (JP); Hitachi Systems, Ltd., Tokyo (JP)

(72) Inventors: Motoaki Yamamura, Tokyo (JP); Masata Nishida, Tokyo (JP); Kazuo Kawamorita, Tokyo (JP)

(73) Assignee: SecureBrain Corporation & Hitachi Systems, Ltd.

(*) Notice: Subject to any disclaimer, the term of this patent is extended or adjusted under 35 U.S.C. 154(b) by 242 days.

(21) Appl. No.: 15/306,685

(22) PCT Filed: Feb. 20, 2015

(86) PCT No.: PCT/JP2015/054707
§ 371 (c)(1),
(2) Date: Oct. 25, 2016

(87) PCT Pub. No.: WO2015/162985
PCT Pub. Date: Oct. 29, 2015

(65) Prior Publication Data
US 2017/0048272 A1 Feb. 16, 2017

(30) Foreign Application Priority Data
Apr. 25, 2014 (JP) ................................ 2014-090901

(51) Int. Cl.
*H04L 29/06* (2006.01)

(52) U.S. Cl.
CPC .......... *H04L 63/1466* (2013.01); *H04L 63/08* (2013.01); *H04L 63/10* (2013.01);
(Continued)

(58) Field of Classification Search
CPC . H04L 63/14; H04L 63/1408; H04L 63/1466; H04L 63/10; H04L 63/08;
(Continued)

(56) References Cited

U.S. PATENT DOCUMENTS

| | | | | |
|---|---|---|---|---|
| 7,062,552 B2* | 6/2006 | Jung | ....................... | G06F 21/56 709/224 |
| 8,661,257 B2* | 2/2014 | Laitinen | ................ | G06F 21/575 713/170 |

(Continued)

FOREIGN PATENT DOCUMENTS

| | | |
|---|---|---|
| JP | 2002342281 | 11/2002 |
| JP | 2004520636 | 7/2004 |

(Continued)

OTHER PUBLICATIONS

Translation for application No. JP 2010198054A (Year: 2010).*
(Continued)

*Primary Examiner* — Saleh Najjar
*Assistant Examiner* — Khalid M Almaghayreh
(74) *Attorney, Agent, or Firm* — Davis, Malm. & D'Agostine, P.C.; Richard L. Sampson

(57) ABSTRACT

[Problem] A fraud detection network system and a fraud detection method are provided which efficiently detect the behavior of malware performing an unauthorized operation, which are easily introduced and which are unlikely to be attacked.
[Solution] In a fraud detection network system, a web server device transmits web content information including a call script to a user terminal device, the user terminal device displays the web content and performs the call script. The user terminal device acquires a fraud detection script from a fraud detection server based on the call script, searches detection target data included in the web content information
(Continued)

based on the fraud detection script and transmits the result of the search to the fraud detection server device. Then, a predetermined fraud measure operation is performed based on a fraud detection result received from the fraud detection server.

16 Claims, 11 Drawing Sheets

(52) U.S. Cl.
CPC .............. *G06F 2221/2101* (2013.01); *G06F 2221/2103* (2013.01)

(58) Field of Classification Search
CPC .............. H04L 63/148; H04L 63/145; H04L 41/02353; H04L 9/3273; H04L 9/3271; H04L 29/06; G06F 21/30; G06F 21/00; G06F 21/31; G06F 21/56; G06F 21/44; G06F 21/445; G06F 21/51; G06F 2221/2103; G06F 2221/2119; G06F 21/14; G06F 21/54; G06F 2221/2101; G06Q 20/4016; G06Q 30/0225; G06Q 30/0248; G06Q 30/0185
USPC .......... 726/14, 18, 19, 4; 709/224, 226, 229, 709/202
See application file for complete search history.

(56) References Cited

U.S. PATENT DOCUMENTS

| | | | | |
|---|---|---|---|---|
| 9,021,553 | B1* | 4/2015 | Corn | G06F 21/31 726/2 |
| 9,516,107 | B2* | 12/2016 | Kaplan | H04L 67/1095 |
| 9,544,329 | B2* | 1/2017 | Call | H04L 63/145 |
| 2002/0065884 | A1* | 5/2002 | Donoho | G06Q 30/02 709/204 |
| 2003/0023708 | A1* | 1/2003 | Jung | G06F 21/56 709/221 |
| 2003/0084296 | A1* | 5/2003 | Kyojima | H04L 63/08 713/171 |
| 2005/0216768 | A1* | 9/2005 | Eppert | G06F 21/31 726/5 |
| 2007/0192863 | A1* | 8/2007 | Kapoor | G06F 9/505 726/23 |
| 2007/0239604 | A1* | 10/2007 | O'Connell | G06Q 30/06 705/50 |
| 2007/0266426 | A1* | 11/2007 | Iyengar | H04L 9/3213 726/5 |
| 2008/0281983 | A1* | 11/2008 | Cooley | H04L 63/145 709/245 |
| 2009/0019546 | A1* | 1/2009 | Park | G06F 21/57 726/24 |
| 2009/0193497 | A1* | 7/2009 | Kikuchi | G06F 21/54 726/1 |
| 2010/0077481 | A1* | 3/2010 | Polyakov | G06F 21/552 726/24 |
| 2010/0162393 | A1* | 6/2010 | Sobel | G06F 21/554 726/23 |
| 2011/0238855 | A1* | 9/2011 | Korsunsky | G06F 21/55 709/231 |
| 2012/0198528 | A1* | 8/2012 | Baumhof | G06F 21/56 726/6 |
| 2013/0325591 | A1* | 12/2013 | Delug | G06Q 30/0248 705/14.45 |
| 2014/0298468 | A1* | 10/2014 | Yamamura | G06F 21/552 726/23 |

FOREIGN PATENT DOCUMENTS

| | | | | |
|---|---|---|---|---|
| JP | 2008276774 | | 11/2008 | |
| JP | 2010182293 | | 8/2010 | |
| JP | 2010282293 | | 8/2010 | |
| JP | 2010198054 | | 9/2010 | |
| JP | 2010198054 | A * | 9/2010 | |
| JP | 2011512576 | | 4/2011 | |
| JP | 2013196222 | | 9/2013 | |
| WO | WO-2005088901 | A1 * | 9/2005 | ............ G06F 21/33 |
| WO | WO-2013043888 | A1 * | 3/2013 | ............ H04L 63/08 |
| WO | PCT/JP2015/054707 | | 5/2015 | |

OTHER PUBLICATIONS

"Limosa Web Browser Protection"; http://www.ffri.jp/products/limosa/index.htm; 4 pages.
Kamizono, M., Nishida, M., Kojima, E., Hoshiawa, Y.; "Categorizing Hostile JavaScript using Abstract Syntax Tree Analysis"; IPSJ Journal; Jan. 28, 2013; (received date); vol. 54, No. 1 (CD-Rom); pp. 349 to 356.

* cited by examiner

FRAUD DETECTION NETWORK SYSTEM AND FRAUD DETECTION METHOD

TECHNICAL FIELD

The present invention relates to a system and a method in which a fraud detection server device detects the falsification of authorized content in a user terminal device, and more particularly relates to a fraud detection technology for detecting that malware rewrites web content information to make the web browser processing means of the user terminal device perform an unauthorized operation.

BACKGROUND ART

In the development of the provision of services such as Internet banking in which an advanced security is required, various types of malware attacking methods are used. As an example, in conventional malware, when a user terminal device is infected with the malware, an ID and a password which are input at the time of login are read and abused for a user's unintended remittance and the like. In this case, in order to prevent damage, a one-time password which is changed each time is introduced or communication is encrypted.

A method is often adopted in which first authentication using an ID and a password that are normal is performed to establish a communication session and in which thereafter second authentication is performed so as to prevent an authorized access. Since the second authentication often has a format in which only a few questions from a random number table previously provided to the user are arbitrarily asked, an authorized access is not successful without reception of the entire random number table. Hence, a method called fishing is present in which a screen very similar to a bank site is introduced to make the user input all answers in the random number table.

Since in the case of the fishing, the accessed site is a false site, it is relatively easy to detect the site with the attention of the user or security software.

Hence, in recent times, for example, an attack method appears in which the first authentication is successfully passed by entering the process of a browser, in which thereafter a plain text after SSL encrypted communication has been decoded is falsified to display a false second authentication screen and in which thus necessary information is stolen without any notice by the user or the user performs an unintended operation. This attack is called a Man In The Browser (MITB) attack, and since an unauthorized operation is performed in a state where an authorized site is connected, it is disadvantageously difficult for the user to find the attack with virus detection software.

For example, patent literature 1 discloses a method of detecting the Man In The Browser attack in which the external transmission of a web site is intercepted, in which it is compared with a transaction fingerprint related to the web site and in which thus whether or not the external transmission is performed by the input of the user is determined.

Non patent literature 1 also discloses software ("Limosa" made by FFRI, Inc) in which a secure module for coping with the MITB attack described above is installed into the side of a terminal to prevent the intervention of malware. In the present software, when the user accesses and logs in to a target site, the secure module is downloaded from the side and is automatically applied to the browser.

CITATION LIST

Patent Literature

Patent Literature 1: Japanese Unexamined Patent Application Publication No. 2010-182293

Non Patent Literature

Non Patent Literature 1: "FFRI Limosa Product Outline" Internet URL www.ffrijp/products/limosa/index.htm searched on Mar. 13, 2014

SUMMARY OF INVENTION

Technical Problem

Since the malware which performs the MITB attack described above hijacks a web browser in a state where an authorized web site is connected, the conventional authentication method cannot cope with it.

In the method disclosed in non patent literature 1 described above, it is necessary to install the secure module into the user terminal device.

The present invention is made in view of the foregoing problems present in the conventional technology, and an object thereof is to provide a fraud detection network system and a fraud detection method which efficiently detect the behavior of malware performing an unauthorized operation, which are easily introduced and which are unlikely to be attacked.

Solution to Problem

In order to solve the problems described above, the present invention provides the following fraud detection network system.

Specifically, the present invention provides a fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection sever device connected to the network detects an unauthorized operation in the user terminal device.

In the present system, the web server device includes: a storage means which stores web content information used for the provision of the service and a call script for calling the fraud detection server device; and a content transmission means which transmits, to the user terminal device, the web content information including the call script.

The user terminal device includes: a content reception means which receives the web content information; a web browser processing means which displays the web content, which receives an information input from the user and which performs the call script; and a fraud detection server communication means which communicates with the fraud detection server device.

In the user terminal device, based on the call script, a fraud detection script is acquired from the fraud detection server, based on the fraud detection script, detection target data included in the web content information is searched, the result of the search is transmitted to the fraud detection server device and a predetermined fraud measure operation is performed based on a fraud detection result received from the fraud detection server device.

The fraud detection server device includes: a fraud detection script storage means which stores the fraud detection script corresponding to the call script; a user terminal communication means which communicates with the user terminal device; and a fraud detection means which detects, on the result of the search by the fraud detection script, whether or not the unauthorized operation is present.

The following configuration may be adopted. The web content is changed such that the web browser processing means is prevented from receiving an input of information related to authentication from the user based on the fraud detection script.

The detection target data may be a tag and attribute information on the tag in a markup language. The detection target data may be text related to the authentication processing.

The following configuration may be adopted. First authentication processing is performed between an authentication means of the web server device and the authentication means of the user terminal device, thereafter secure communication is established between the web server device and the user terminal device and the web server device transmits, to the user terminal device, the web content information including the call script.

The following configuration may be adopted. In the fraud detection server device, at least any one of the result of the search transmitted from the user terminal device and the result of the detection by the fraud detection means is recorded by a log recording means.

The following configuration may be adopted. The web server device includes an obfuscation means which obfuscates the call script, and the content transmission means transmits the web content information including the obfuscated call script.

The present invention also can provide the following fraud detection network system.

Specifically, the present invention provides a fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection sever device connected to the network detects an unauthorized operation in the user terminal device, where the web server device includes: a storage means which stores web content information used for the provision of the service and a fraud detection script; and a content transmission means which transmits, to the user terminal device, the web content information including the fraud detection script.

The user terminal device includes: a content reception means which receives the web content information; a web browser processing means which displays the web content, which receives an information input from the user and which performs the fraud detection script; and a fraud detection server communication means which communicates with the fraud detection server device, based on the fraud detection script, detection target data included in the web content information is searched, a result of the search is transmitted to the fraud detection server device and a predetermined fraud measure operation is performed based on a fraud detection result received from the fraud detection server device, and the fraud detection server device includes: a user terminal communication means which communicates with the user terminal device; and a fraud detection means which detects, on the result of the search by the fraud detection script, whether or not the unauthorized operation is present.

The present invention also can provide the following fraud detection method.

Specifically, the present invention provides a fraud detection method in a fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection sever device connected to the network detects an unauthorized operation in the user terminal device.

The present method includes at least:

(S1) a content transmission step of, by a content transmission means of the web server device, transmitting, to the user terminal device, web content information used for the provision of the service including a call script for calling the fraud detection server device;

(S2) a content reception step of, in the user terminal device, by a content reception means, receiving the web content information;

(S3) a fraud detection script acquisition step of, by a web browser processing means, acquiring a fraud detection script from the fraud detection server based on the call script;

(S4) a search result transmission step of, searching detection target data included in the web content information based on the fraud detection script and transmitting a result of the search to the fraud detection server device;

(S5) a fraud detection step of, in the fraud detection server device, by a fraud detection means, detecting on the result of the search whether or not the unauthorized operation is present and transmitting a fraud detection result to the user terminal device; and (S6) a fraud measure operation step of by the web browser processing means of the user terminal device, performing a predetermined fraud measure operation based on the fraud detection result.

After the fraud detection script acquisition step (S3), the web content may be changed such that the web browser processing means is prevented from receiving an input of information related to authentication from the user based on the fraud detection script.

The following configuration may be adopted. Before the content transmission step (S1), the fraud detection method includes: a secure communication establishment step (S01) of establishing secure communication between the web server device and the user terminal device; and a first authentication step (S02) of performing first authentication processing between an authentication means of the web server device and an authentication means of the user terminal device.

The following configuration may be adopted. After the search result transmission step (S4) or the fraud detection step (S5), the fraud detection method includes: a log recording step (S41) of, by a log recording means of the fraud detection server device, recording at least any one of the result of the search transmitted from the user terminal device and a result of the detection by the fraud detection means.

The following configuration may be adopted. Before the content transmission step (S1), the fraud detection method includes: an obfuscation step (S03) of, by an obfuscation means of the web server device, obfuscating the call script.

The present invention also can provide the following fraud detection method in a fraud detection network system.

Specifically, the present method includes at least: a content transmission step of, by a content transmission means of the web server device, transmitting, to the user terminal device, web content information used for the provision of the service including a fraud detection script; a content reception step of, in the user terminal device, by a content reception means, receiving the web content information; a search result transmission step of, by a web browser processing means, searching detection target data included in the web content information based on the fraud detection script and transmitting a result of the search to the fraud detection server device; a fraud detection step of, in the fraud detection server device, by a fraud detection means, detecting on the result of the search whether or not the unauthorized operation is present and transmitting a fraud detection result to the user terminal device; and a fraud measure operation step of, by the web browser processing means of the user terminal device, performing a predetermined fraud measure operation based on the fraud detection result.

Advantageous Effects of Invention

In the configuration of the present invention described above, it is possible to provide the fraud detection network system and the fraud detection method which efficiently detect the behavior of malware performing an unauthorized operation, which are easily introduced and which are unlikely to be attacked. In particular, as compared with the conventional technology, effects are provided in that the web content information including the call script is only transmitted, and thus it is possible to perform the initial introduction, and that the obfuscated script is used so as to be difficult to detect.

DESCRIPTION OF EMBODIMENTS

Embodiments of the present invention will be described below with reference to drawings. The present invention is not limited to the following embodiments, and can be practiced as necessary in the scope of claims.

Figure 1:
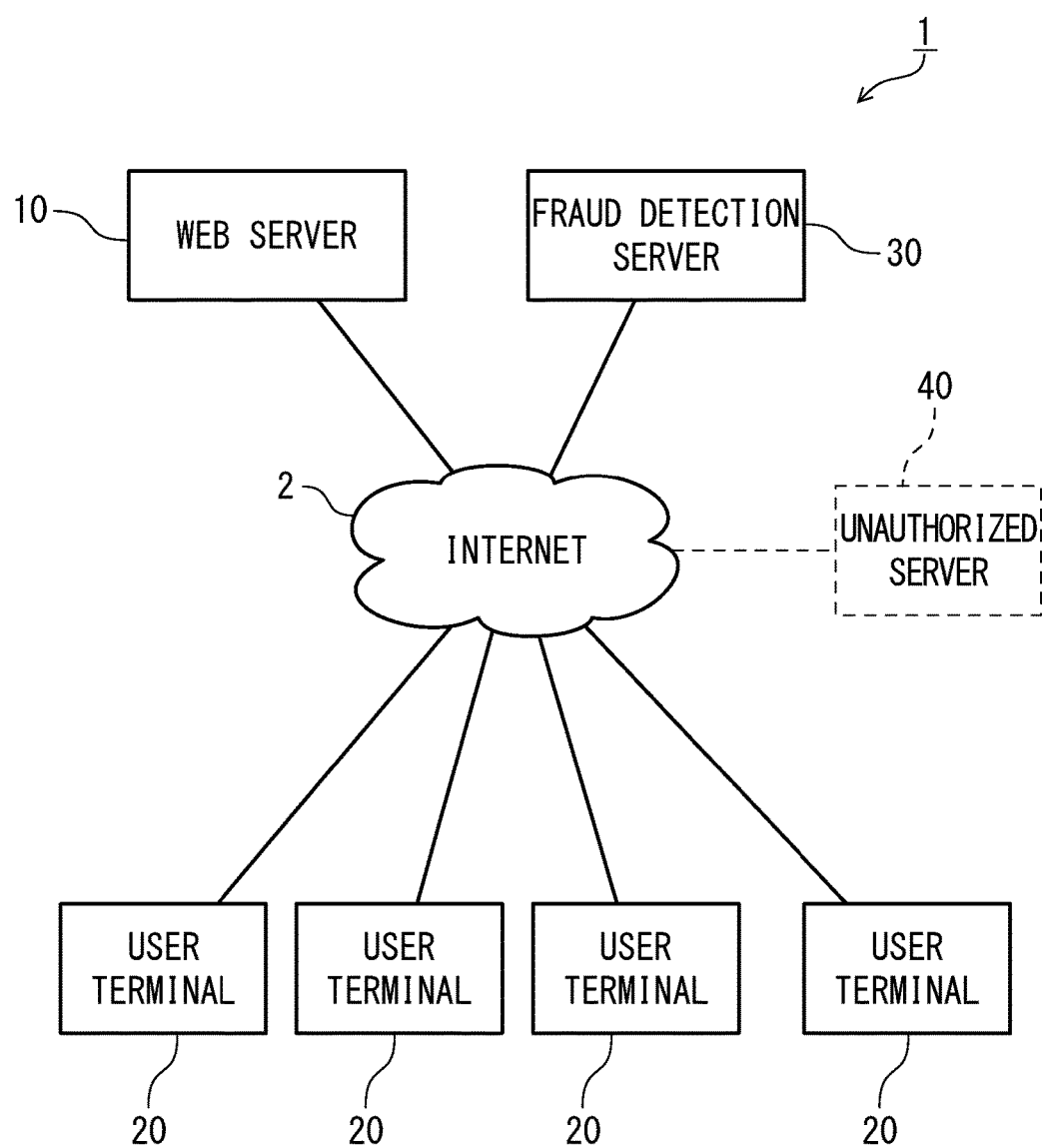
FIG. 1 An overall diagram of a fraud detection network system in the present invention.

FIG. 1 is an overall diagram of a fraud detection network system 1 in the present invention. The present system can be applied to systems such as known Internet banking and an online security system that provide services in which a particularly advanced security is required.

A method is known in which in such a system, a web server device transmits a question that is randomly selected from combinations of a plurality of questions allocated for each user and the correct answers therefor, in which the correct answer is returned from a user terminal device that is connected with a network and in which thus authentication processing is performed. For example, in Internet banking, an authentication method is used in which a random number table with five columns and five rows is previously distributed to each contractor, and in which two numbers from the random number table are asked. An authentication method is also known in which some questions are provided from questions such as the name of a pet and the mother's maiden name that the user previously sets and in which the correct answers are required.

The present invention provides a technology for preventing malware from changing an authorized screen to acquire, in an unauthorized manner, correct answers which are not originally asked.

The present system 1 is formed with a web server 10 which is connected to a network such as the Internet 2, user terminals 20 and a fraud detection server 30, and as it is well known, the web server 10 receives access from a large number of user terminals 20 to provide services using the web such as Internet banking.

In the MITB attack which is the target of the present invention, while communication between the web server 10 and the user terminal 20 is achieved, the details of web content received from the web server 10 are rewritten and are displayed in a web browser, and thus the user is made to input information different from the original information. Disadvantageously, since the user cannot distinguish them from questions which are from the web server at the correct connection destination, the user provides information which should not be provided. Consequently, the input information is transmitted to an unauthorized server 40 which is connected with the Internet by the malware.

Figure 2:
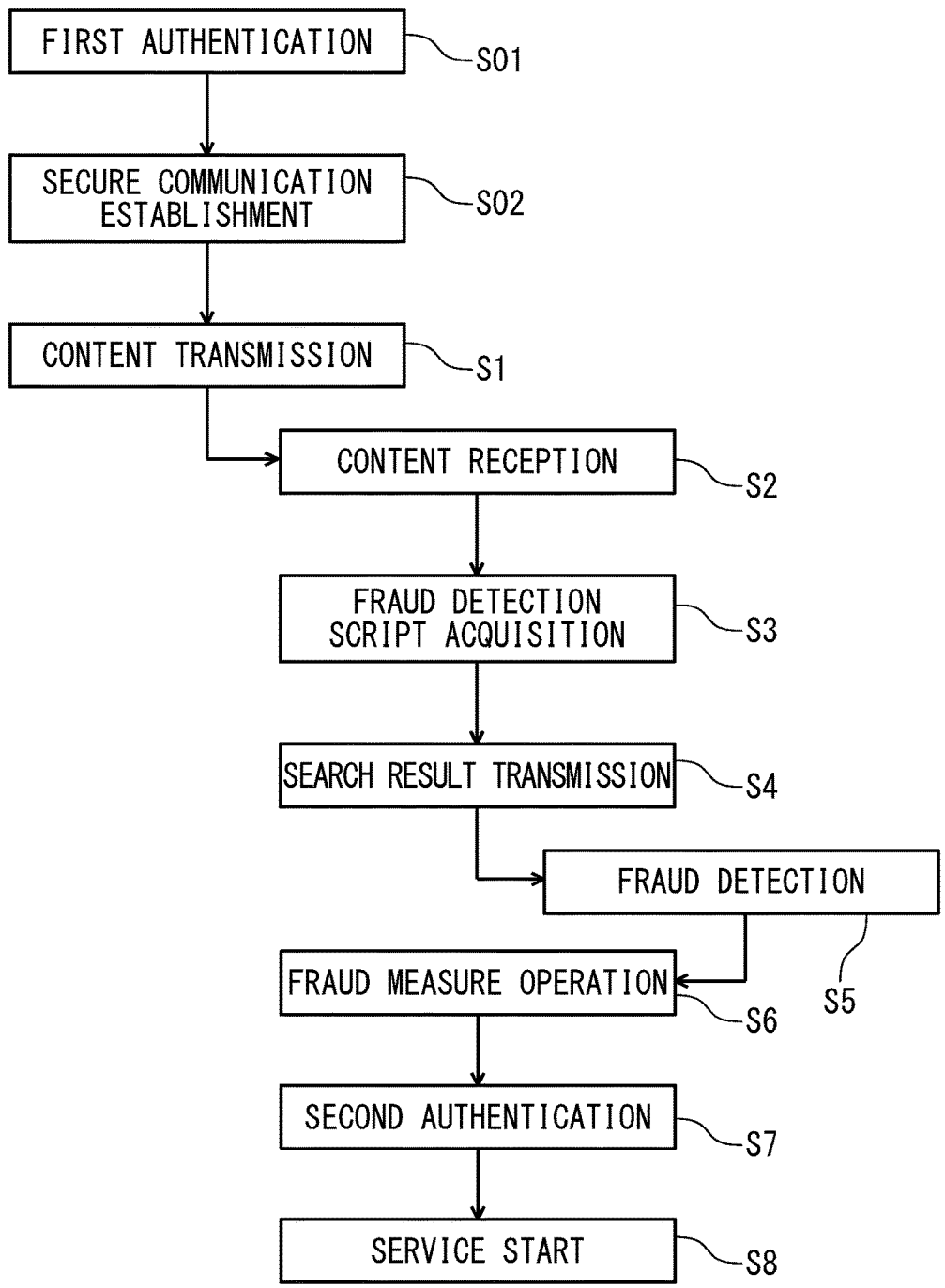
FIG. 2 A flowchart of a fraud detection method of the present invention.
Figure 3:
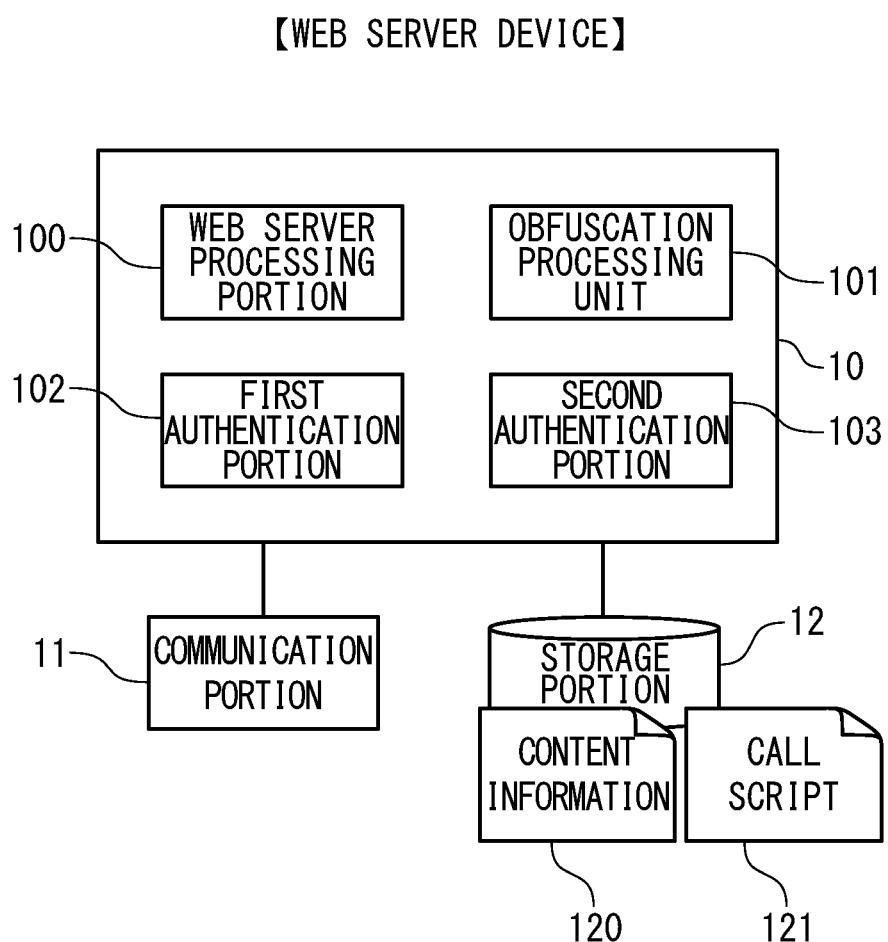
FIG. 3 A block diagram of a web server device according to the present invention.
Figure 4:
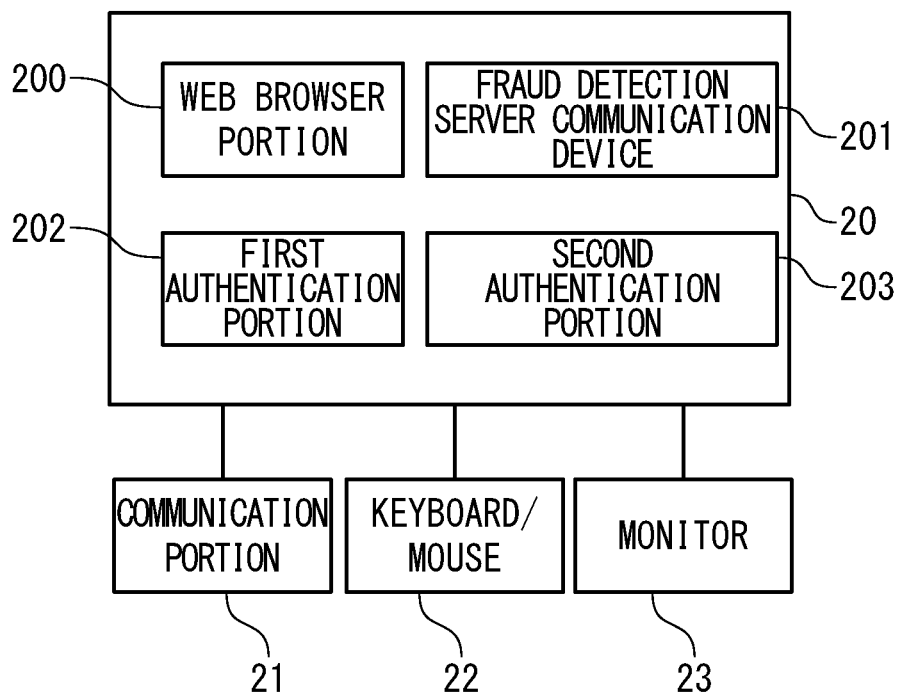
FIG. 4 A block diagram of a user terminal device according to the present invention.
Figure 5:
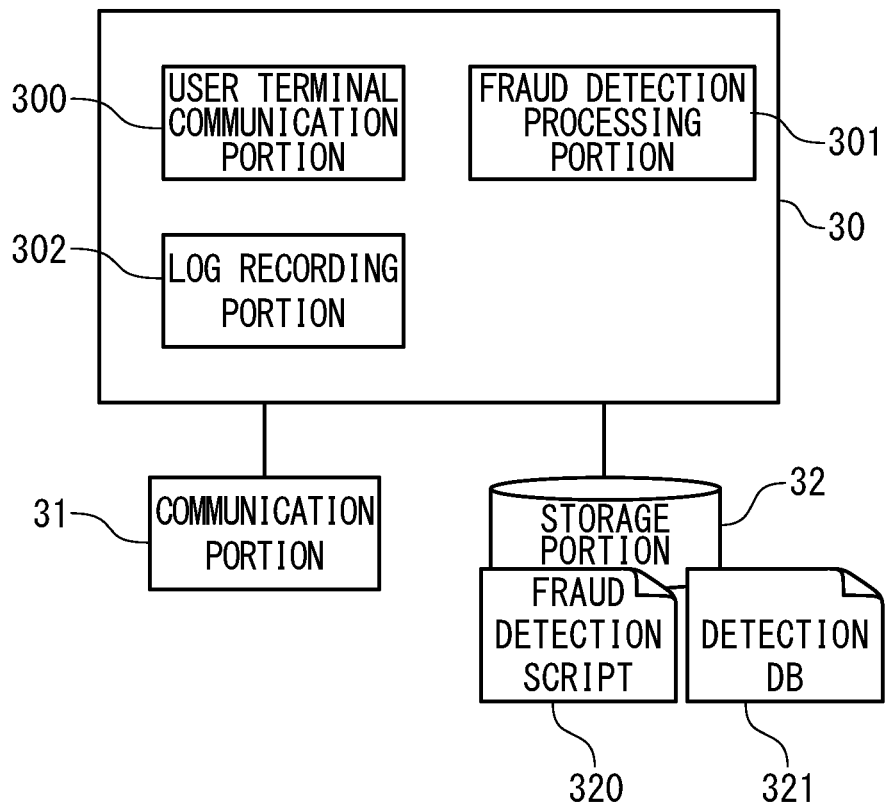
FIG. 5 A block diagram of a fraud detection server device according to the present invention.

FIG. 2 is a flowchart of a fraud detection method according to the present invention, FIG. 3 is a block diagram of the web server 10, FIG. 4 is a block diagram of the user terminal 20 and FIG. 5 is a block diagram of the fraud detection server 30. A description will be given below with reference to the drawings.

The web server 10 is a known server device using a computer, and includes a web server processing portion 100 which is realized in a CPU 10 by a computer program, an obfuscation processing portion 101, a first authentication portion 102 and a second authentication portion 103. The web server 10 also includes a communication portion 11 which is a network interface for performing communication with the Internet 2 and a storage portion 12 which is formed with a hard disk and a memory. The other known configurations will be omitted.

In the storage portion 12, content information 120 for providing services and a call script 121 according to the present invention are stored.

The user terminal 20 is also a known terminal device using a computer, and includes a web browser portion 200 which is realized in a CPU 20 by a computer program, a fraud detection server communication portion 201, a first authentication portion 202 and a second authentication portion 203. A communication portion 21 which performs communication with the Internet 2 and input means such as a keyboard/mouse 22 and a monitor 23 which performs screen display are connected to the user terminal 20.

Furthermore, the fraud detection server 30 is also a known server device, in a CPU 30, a user terminal communication portion 300, a fraud detection processing portion 301 and a log recording portion 302 are installed and a communication portion 31 which performs communication with the Internet 2 and a storage portion 32 in which a fraud detection script 320 and a detection data base 321 are stored are connected to the fraud detection server 30.

Although it is not necessary in the practice of the present invention, in general, secure communication such as SSL communication is established (S01) between the web server 10 and the user terminal 20, thereafter as first authentication (S02) processing, the first authentication portion 102 of the web server transmits, to the user terminal 20, a screen for prompting the user to input an ID and a password and authentication information input by the user is returned by the first authentication portion 202.

In a conventional general procedure, the second authentication is performed after the first authentication, and thus the provision of the service is started. In the present invention, when the web server processing portion 100 of the web server 10 transmits, to the user terminal 20, the information with which to perform screen display for the input of the second authentication, that is, the content information 120 which is written in a markup language, the web server processing portion 100 transmits the information including the call script 121 written in JavaScript (registered trademark) (content transmission step: S1).

Figure 6:
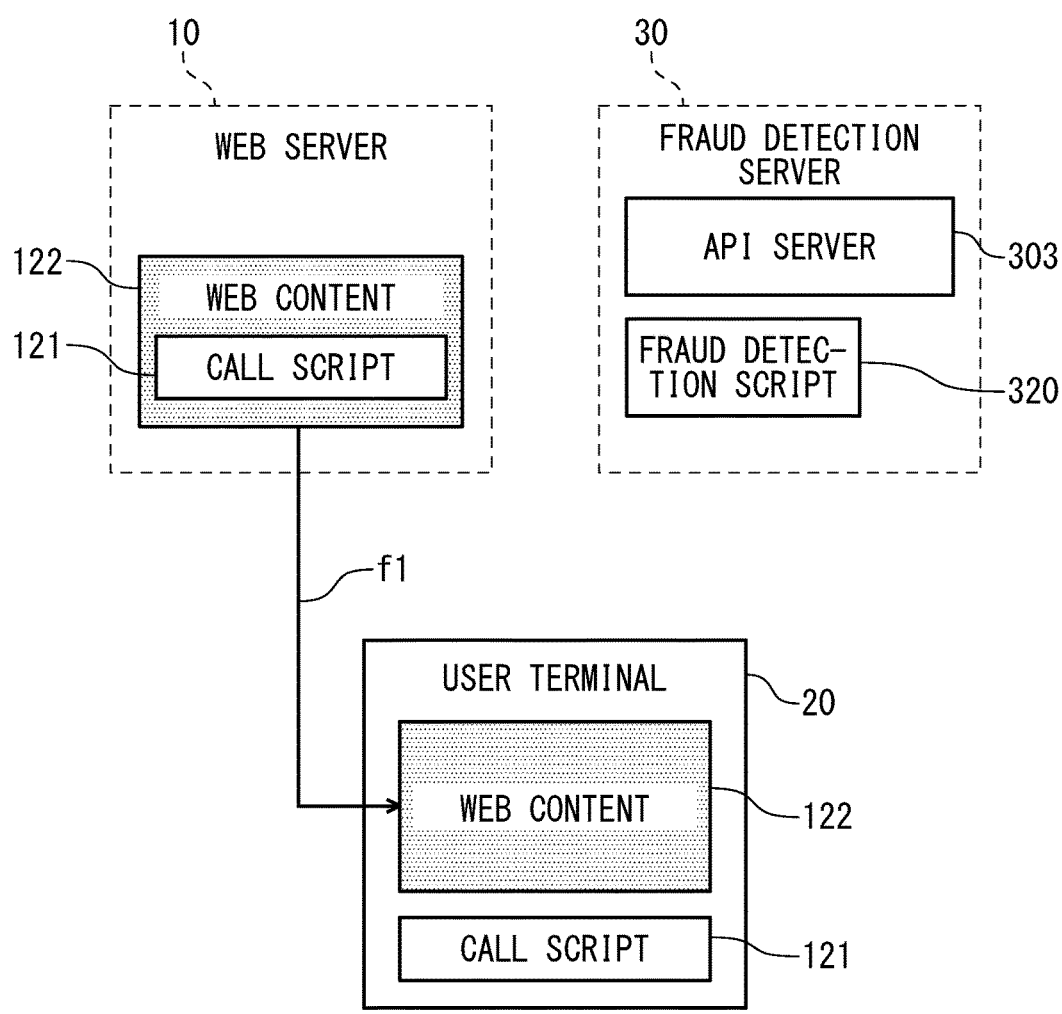
FIG. 6 A processing illustrative diagram of a first stage in the fraud detection method of the present invention.

FIG. 6 shows the flow of information in the first stage of the present invention, and shows a state where web content 122 in which the call script 121 is present within the content information 120 is transmitted (f1) to the user terminal 20.

When the user terminal 20 receives (S2) the content, the call script 121 is read from the web content 122, and the web browser portion 200 performs execution processing. As it is well known, the execution of JavaScript can be normally performed by almost all web browser applications. The script language of the present invention is not limited to JavaScript, and can be arbitrarily applied to a program as long as the program can be performed by the browser of the user terminal and can be performed on the browser of the user terminal.

Figure 7:
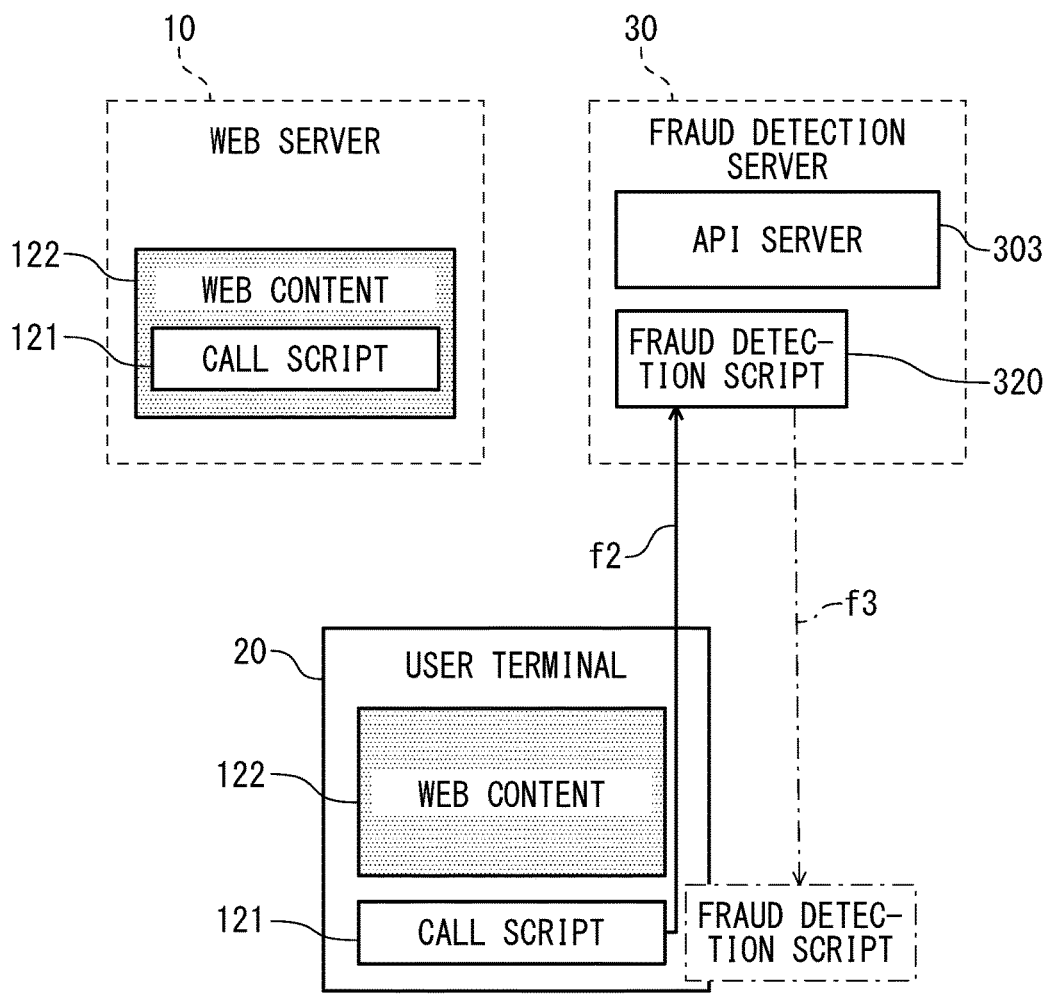
FIG. 7 A processing illustrative diagram of a second stage in the fraud detection method of the present invention.

FIG. 7 shows the flow of information in the second stage of the present invention. The call script defines the address of the fraud detection server 30 and the information which needs to be read, and access (f2) from the user terminal 20 is performed accordingly.

For the access described above, the user terminal communication portion 300 of the fraud detection server 30 reads, from the storage portion 32, the fraud detection script 320 specified by the call script 121 and returns (f3) it to the fraud detection server communication portion 201 of the user terminal 20 (fraud detection script acquisition step: S3).

As a feature of the present invention, the fraud detection script simply searches the details of the web content 122 received by the user terminal 20 and extracts necessary information but does not perform a virus search or the like.

In other words, when an execution file for performing a virus search is conventionally transmitted, it needs much time to transmit the file itself and thereafter perform the search. For example, when a virus search is performed by Active X (registered trademark) control, the behavior thereof itself is easily detected by malware, and thus the search is disadvantageously blocked. Furthermore, for Active X control, for example, a plugin to the web browser needs to be installed, and thus the environment of the execution is disadvantageously limited.

In the present invention, since the fraud detection script is only received, it is advantageously unlikely to be distinguished from communication in a normal service, and since simple search processing is only performed after the communication of a small-capacity script, it is possible to achieve high-speed processing. In actuality, even when the processing of the present invention is introduced, since the processing time until the second authentication is completed for a very short period of time, the user is prevented from being aware of the processing.

Figure 8:
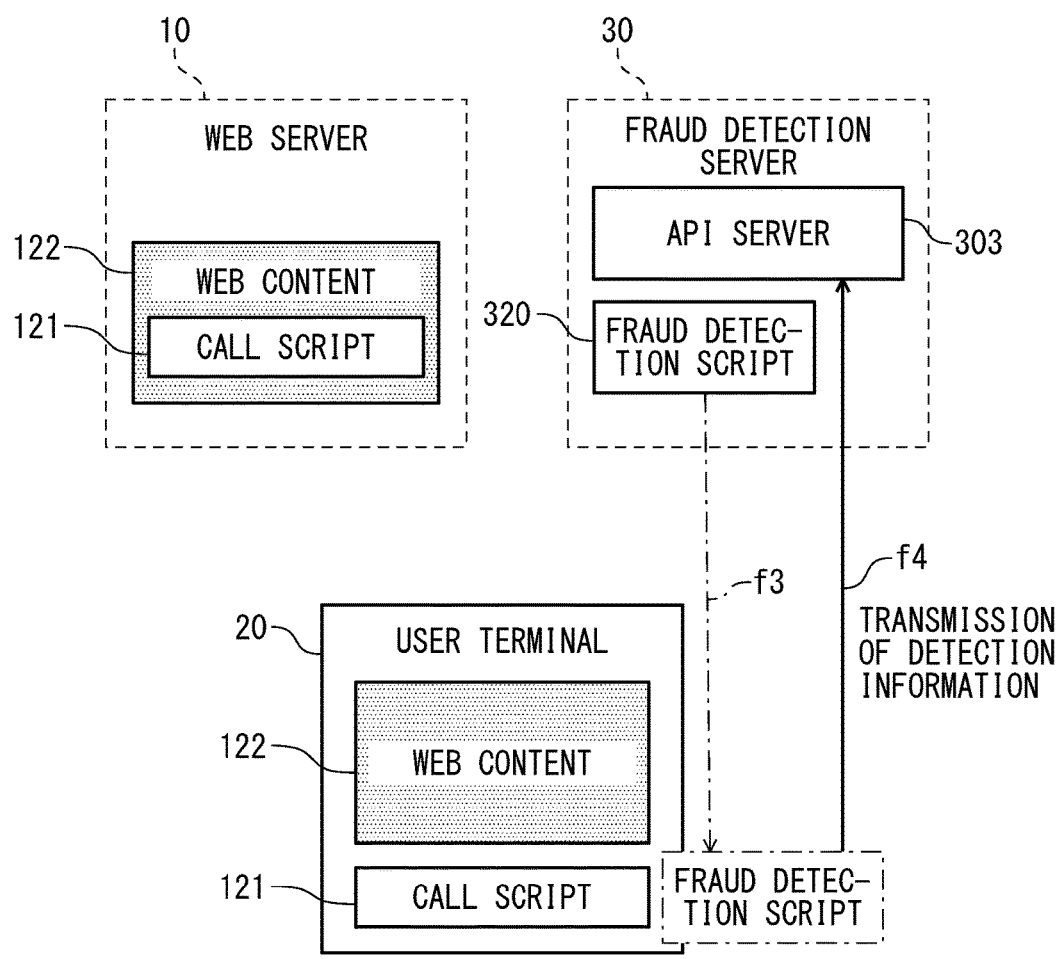
FIG. 8 A processing illustrative diagram of a third stage in the fraud detection method of the present invention.

In the web browser portion 200, detection target data included in web content information is searched according to the fraud detection script, and the result of the search is transmitted to a fraud detection server device (search result transmission step: S4). FIG. 8 shows the flow of information in the third stage of the present invention.

As an example where a search is performed by the fraud detection script in the user terminal 20, an input tag and a form tag in the HTML language of the web content 122 are present. In the MITB attack, even when the web server 10 and the user terminal 20 perform secure communication through SSL, the communication is decoded, and the content is rewritten immediately before a display is produced on the user terminal 20 with the web browser. Hence, information related to HTML content is searched so that whether or not the content is rewritten is checked.

Specifically, it is also possible to extract the numbers of input tags and form tags included in the web content 122. It is possible to find a case where though only two numbers are originally input, 15 input fields are provided by rewriting. It is also effective to extract what is included in the attribute information, such as name information, of the input tag.

In the present invention, whether this information is correct is not determined by the user terminal 20 on site, and the fraud detection script 320 only plays a role in searching the information to transmit information to the fraud detection server 30. In the transmission (f4) of detection information in FIG. 8, the web browser portion 200 transmits, to an API server 303, information on the number of tags and names specified in the fraud detection script 320.

As the detection target data which is included in the web content information and which is searched, not only tags but also an arbitrary character string within the HTML content may be used. For example, when a display for giving a warning of a false screen produced by malware is included, the malware may perform rewriting such that the warning screen itself is prevented from being displayed. In order to cope with such a change, it is also possible to search for whether or not text and an image related to the warning screen, a tag on window operation and the like are present.

When the detection information is transmitted, the searched value itself may be transmitted or, for example, a value after a predetermined calculation using a hash function is performed may be transmitted.

Figure 9:
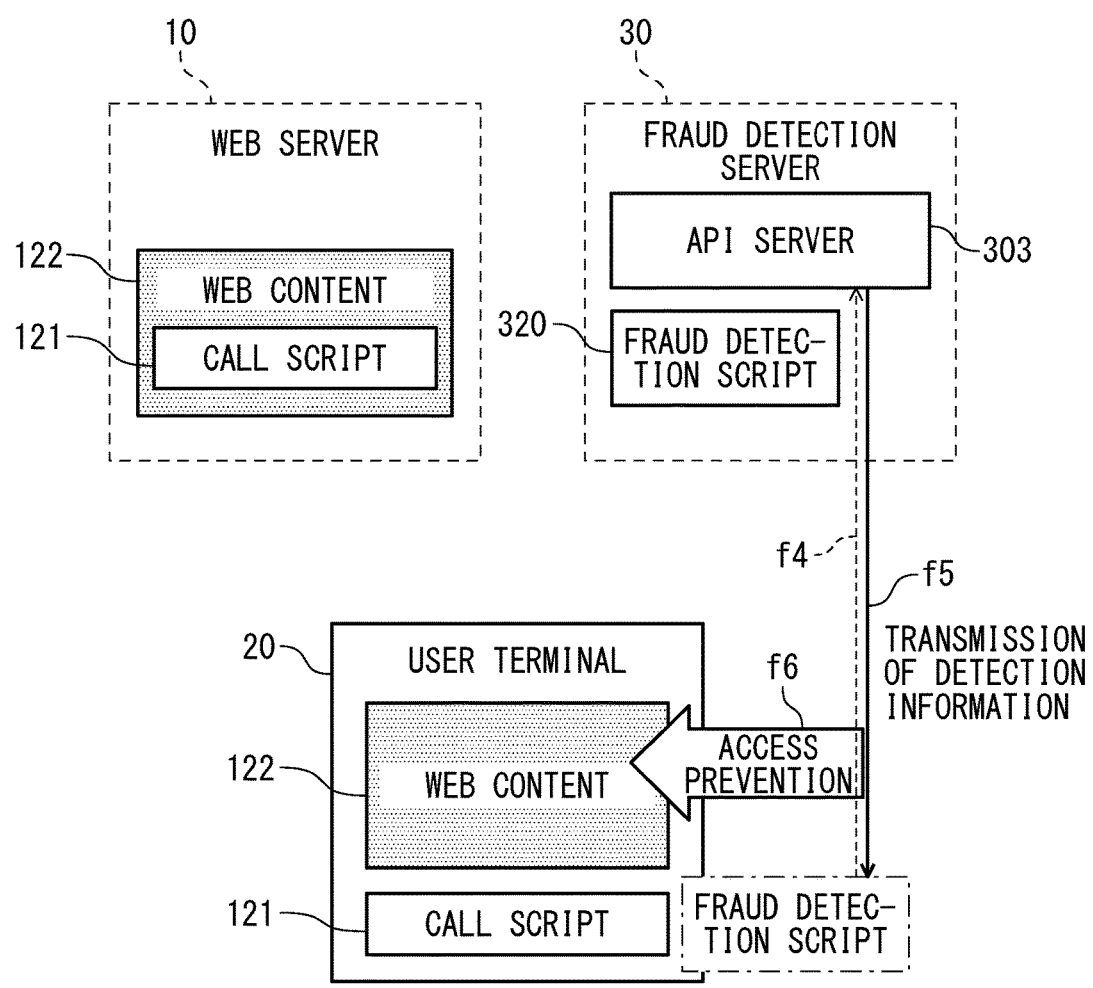
FIG. 9 A processing illustrative diagram of a fourth stage in the fraud detection method of the present invention.

FIG. 9 shows the flow of information in the fourth stage of the present invention.

When the user terminal communication portion 300 of the fraud detection server 30 receives (f4) the specified information, the fraud detection processing portion 301 checks, while referencing the detection data base 321, whether or not the information agrees with the correct information on the web site. According to the embodiment described above, whether or not the numbers of input tags and form tags are changed, whether or not the attribute information such as the name of the tag is modified by addition or removal, whether or not text, the link of an image and an operation tag are changed and the like are checked. As is clear, the checking has a very small load as computer processing, and the checking processing itself is completed for a short period of time.

As described above, in a fraud detection step (S5), whether or not an unauthorized operation is performed by malware is detected, and the result of the determination is transmitted (f5) to the fraud detection server communication portion 201 of the user terminal 20.

The web browser portion 200 performs a fraud measure operation (S6) according to the result of the determination from the fraud detection server 30. In other words, when it is recognized that, for example, the web content 122 is rewritten, the fraud detection script 320 may prevent the information from the user terminal 20 from being transmitted (f6) and perform, for example, a warning display to the user. Alternatively, a signal for temporarily disabling the account of the user may be transmitted to the web server 10. In the present invention, the fraud measure operation is not limited.

On the other hand, when there is no problem in the result of the determination, the process is normally moved to second authentication processing (S7) where the service is started (S8).

Figure 10:
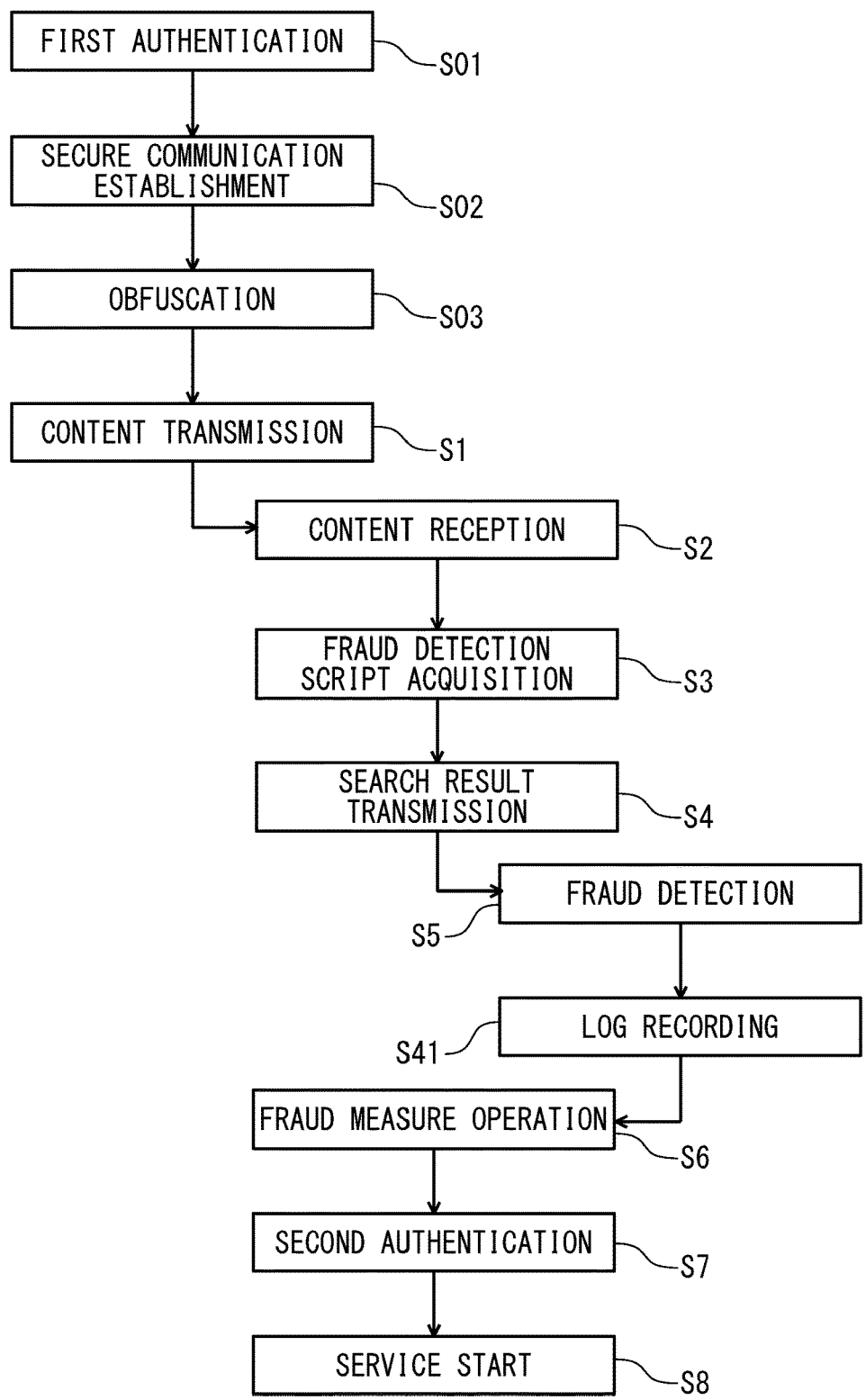
FIG. 10 A flowchart of another embodiment of the fraud detection method of the present invention.

FIG. 10 shows a flowchart in another embodiment of the present invention.

In the present embodiment, when the call script 121 is included in the web content 122, obfuscation processing (S03) is performed in the obfuscation processing portion 101. The obfuscation processing of JavaScript is known, and as long as a technology is intended for preventing the details of the script from being clear, the technology can be applied as necessary. With the obfuscation, it is possible to prevent the malware from easily detecting the presence and details of the call script. The obfuscation processing is preferably performed before the content transmission step (S1). For example, the obfuscation processing is preferably performed when the content is prepared.

At the same time, a script is generally included in the screens of the first authentication and the second authentication and other service screens, and such a general script is obfuscated together with the call script, with the result that an effect of preventing the malware from easily performing the operation is further obtained. For example, it is possible to detect that the script is included but it is difficult for the side of an abuser to cut the screen into the original portion and the call script. It is expected that the necessary script is deleted to prevent an originally expected operation from being performed and that a web application is not properly performed on the browser. Hence, the obfuscation processing (S03) particularly effectively acts in combination with the present invention.

Although in the embodiment described above, the obfuscation processing (S03) is performed on the call script 121, the obfuscation processing (S03) may be performed on the fraud detection script. In other words, as described above, the obfuscation processing portion 101 is included in the fraud detection server 30, and thus it is also possible to obfuscate the fraud detection script.

Even in this case, each time the fraud detection script is transmitted, the fraud detection script may be obfuscated or when the fraud detection script is prepared, the fraud detection script t may be obfuscated.

After the fraud result transmission step (S4) or the fraud detection step (S5), the log recording portion 302 of the fraud detection server 30 can also record at least any one of the result of the search received from the user terminal 20 or the result of the detection by the fraud detection processing portion 301 (log recording step: S41).

Examples of the information on the logs collected include the identification number of the web content searched as the result of the determination, the result of the determination, the IP address of the user terminal 20, the User-Agent information of the web browser and the access date.

The searched content itself may be recorded, and in such a case, the HTML content after being changed is recorded and can be used for the analysis of the malware.

Before and after the obfuscation processing (S03), the web browser portion 200 can also temporarily stop the input from the user. In other words, since depending on the malware, it is likely that the user produces an input and simultaneously the malware transmits information to the unauthorized server 40, processing for stopping the input is included in the call script 121, and thus the input is prevented from being received in any form, with the result that it is possible to prevent information from being leaked.

Furthermore, in the configuration described above, since the fraud detection server 30 and the web server 20 are dispersed, the address and the domain name of the fraud detection server 30 called by the call script 121 differ from those of the web server 20. In particular, when the domain name clearly differs from that of the administrator of the web server 20, since it is easily detected by the malware, the registration of a DNS (Domain Name Server) is preferably performed such that the domain or the subdomain of the fraud detection server 30 is the same as that of the web server 20. The domain of the web server 20 is the same as that of the fraud detection server 30, and thus the behavior by the fraud detection method of the present invention is made more unclear together with the obfuscation processing (S03) described above.

Figure 11:
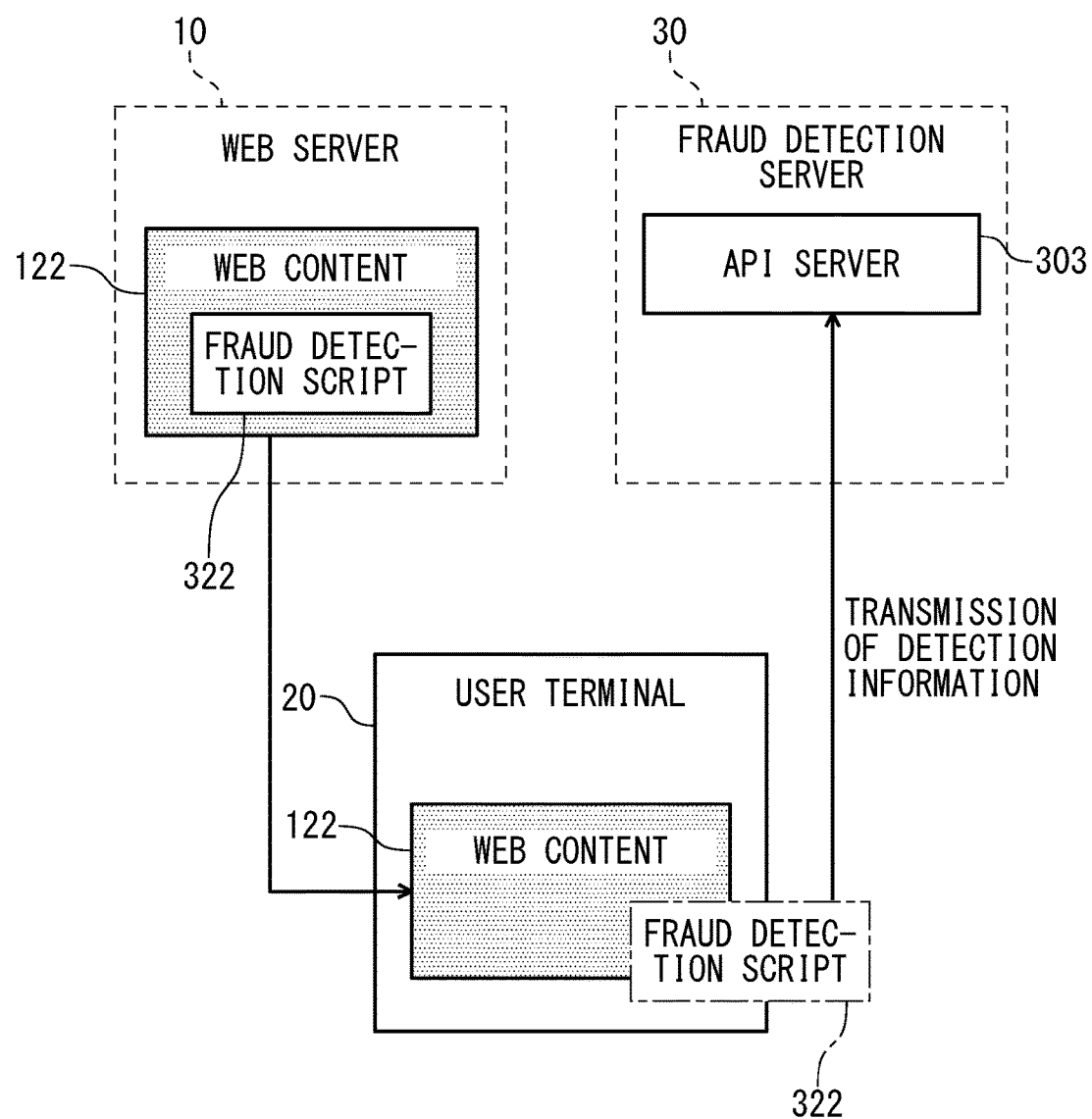
FIG. 11 A processing illustrative diagram of another embodiment of the fraud detection method of the present invention.

In the present invention, instead of the call script described above, the fraud detection script may be included in the web content 122. In other words, as shown in FIG. 11, in the fraud detection network system which is the same as described above, the web server 10 stores, instead of the call script, a fraud detection script 322 together with the web content 122 used for the provision of the service.

The web content 122 included in the fraud detection script 322 is fed to the web browser portion 200 of the user terminal 20, displays the web content, receives an information input from the user and performs the fraud detection script 322.

The subsequent processing is the same as in the embodiment described above, and the web browser portion 200 transmits, to the API server 303, the information on the number of tags and the name specified by the fraud detection script 320.

When the user terminal communication portion 300 of the fraud detection server 30 receives the specified information, the fraud detection processing portion 301 checks, while referencing the detection data base 321, whether or not the information agrees with the correct information on the web site.

The web browser portion 200 performs the fraud measure operation according to the result of the determination from the fraud detection server 30.

As described above, the present invention provides the technology for simply detecting the falsification of the web content in order to cope with the MITB attack. Instead of a black list method in which a list of registered malware and the behavior thereof is provided, necessary conditions in authorized web content are provided as a white list, and thus it is possible to flexibly cope with new malware.

Since the present invention can be practiced by the addition of the script, it is not necessary to install client software in the user terminal device, and moreover, it is possible to realize high-speed processing. The fraud detection sever device collects log information, and thus it is possible to collect information on customers receiving damage, the result of the determination and abnormal content, with the result that it is possible to contribute to the prevention of the expansion of damage.

REFERENCE SIGNS LIST 1 fraud detection network system
2 Internet
10 web server
20 user terminal
30 fraud detection serve
40 unauthorized server
[FIG. 1]
10 WEB SERVER
30 FRAUD DETECTION SERVER
2 INTERNET
40 UNAUTHORIZED SERVER
20 USER TERMINAL
[FIG. 2]
S01 FIRST AUTHENTICATION
S02 SECURE COMMUNICATION ESTABLISHMENT
S1 CONTENT TRANSMISSION
S2 CONTENT RECEPTION
S3 FRAUD DETECTION SCRIPT ACQUISITION
S4 SEARCH RESULT TRANSMISSION
S5 FRAUD DETECTION
S6 FRAUD MEASURE OPERATION
S7 SECOND AUTHENTICATION
S8 SERVICE START
[FIG. 3]
WEB SERVER DEVICE
100 WEB SERVER PROCESSING PORTION
101 OBFUSCATION PROCESSING UNIT
102 FIRST AUTHENTICATION PORTION
103 SECOND AUTHENTICATION PORTION
11 COMMUNICATION PORTION
12 STORAGE PORTION
120 CONTENT INFORMATION
121 CALL SCRIPT
[FIG. 4]
USER TERMINAL DEVICE
200 WEB BROWSER PORTION
201 FRAUD DETECTION SERVER COMMUNICATION DEVICE
202 FIRST AUTHENTICATION PORTION
203 SECOND AUTHENTICATION PORTION
21 COMMUNICATION PORTION
22 KEYBOARD/MOUSE
23 MONITOR
[FIG. 5]
FRAUD DETECTION SERVER DEVICE
300 USER TERMINAL COMMUNICATION PORTION
301 FRAUD DETECTION PROCESSING PORTION
302 LOG RECORDING PORTION
31 COMMUNICATION PORTION
32 STORAGE PORTION
320 FRAUD DETECTION SCRIPT
321 DETECTION DB
[FIGS. 6 to 9]
10 WEB SERVER
122 WEB CONTENT
121 CALL SCRIPT
30 FRAUD DETECTION SERVER
303 API SERVER
320 FRAUD DETECTION SCRIPT
20 USER TERMINAL
F4 TRANSMISSION OF DETECTION INFORMATION
F5 TRANSMISSION OF DETECTION INFORMATION
F6 ACCESS PREVENTION
[FIG. 10]
S01 FIRST AUTHENTICATION
S02 SECURE COMMUNICATION ESTABLISHMENT
S03 OBFUSCATION
S1 CONTENT TRANSMISSION
S2 CONTENT RECEPTION
S3 FRAUD DETECTION SCRIPT ACQUISITION
S4 SEARCH RESULT TRANSMISSION
S5 FRAUD DETECTION
S41 LOG RECORDING
S6 FRAUD MEASURE OPERATION
S7 SECOND AUTHENTICATION
S8 SERVICE START
[FIG. 11]
10 WEB SERVER
122 WEB CONTENT
322 FRAUD DETECTION SCRIPT
30 FRAUD DETECTION SERVER
303 API SERVER
20 USER TERMINAL
122 WEB CONTENT
検知情報の送信 TRANSMISSION OF DETECTION INFORMATION

The invention claimed is:

1. A fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection server device connected to the network detects an unauthorized operation in the user terminal device, wherein the web server device includes:
a data store which stores web content information used for the provision of the service and a call script for calling the fraud detection server device; and
a communication portion which transmits, after secure communication with the user terminal device is established, to the user terminal device, the web content information including the call script, the user terminal device includes:
a web browser which receives, after secure communication with the web server device is established, the web content information including the call script;
a web browser processor which displays the web content, which receives an information input from the user and which performs the call script; and
a fraud detection server which communicates with the fraud detection server device,
based on the call script, a fraud detection script is acquired from the fraud detection server, based on the fraud detection script, detection target data included in the web content information is searched, a result of the search is transmitted to the fraud detection server device and a predetermined fraud measure operation is performed based on a fraud detection result received from the fraud detection server device, and the fraud detection server device includes:
- a fraud detection script store which stores the fraud detection script corresponding to the call script;
- a user terminal communication portion which communicates with the user terminal device; and
- a fraud detection processor which detects, on the result of the search by the fraud detection script, whether or not the unauthorized operation is present.

2. The fraud detection network system according to claim 1, wherein the web content is changed such that the web browser processor is prevented from receiving an input of information related to authentication from the user based on the fraud detection script.

3. The fraud detection network system according to claim 1, wherein the detection target data is a tag and attribute information on the tag in a markup language.

4. The fraud detection network system according to claim 1, wherein the detection target data is text related to the authentication processing.

5. The fraud detection network system according to claim 1, wherein secure communication is established between the web server device and an authentication processor of the user terminal device, first authentication processing is thereafter performed between an authentication processor of the web server device and the authentication processor of the user terminal device and the web server device transmits, to the user terminal device, the web content script information including the call.

6. The fraud detection network system according to claim 1, wherein in the fraud detection server device, at least any one of the result of the search transmitted from the user terminal device and a result of the detection by the fraud detection processor is recorded by a log recorder.

7. The fraud detection network system according to claim 1, wherein the web server device includes an obfuscation processor which obfuscates the call script, and; the communication portion transmits the web content information including the obfuscated call script.

8. A fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection server device connected to the network detects an unauthorized operation in the user terminal device, wherein the web server device includes:
- a data store which stores web content information used for the provision of the service and a fraud detection script; and
- a communication portion which transmits, after secure communication with the user terminal device is established, to the user terminal device, the web content information including the fraud detection script, the user terminal device includes:
- a web browser which receives, after secure communication with the web server device is established, the web content information including the call script;
- a web browser processor which displays the web content, which receives an information input from the user and which performs the fraud detection script; and
- a fraud detection server which communicates with the fraud detection server device,
based on the fraud detection script, detection target data included in the web content information is searched, a result of the search is transmitted to the fraud detection server device and a predetermined fraud measure operation is performed based on a fraud detection result received from the fraud detection server device, and the fraud detection server device includes:
- a user terminal communication portion which communicates with the user terminal device; and
- a fraud detection processor which detects, on the result of the search by the fraud detection script, whether or not the unauthorized operation is present.

9. A fraud detection method in a fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection server device connected to the network detects an unauthorized operation in the user terminal device, the fraud detection method comprising at least:
- a content transmission step of, by a communication portion of the web server device, transmitting, after secure communication with the user terminal device is established, to the user terminal device, web content information used for the provision of the service including a call script for calling the fraud detection server device;
- a content reception step of, in the user terminal device, by a web browser, after secure communication with the web server device is established, receiving the web content information including the call script;
- a fraud detection script acquisition step of, in the user terminal device, by a web browser processor, acquiring a fraud detection script from the fraud detection server based on the call script;
- a search result transmission step of, in the user terminal device, searching detection target data included in the web content information based on the fraud detection script and transmitting a result of the search to the fraud detection server device;
- a fraud detection step of, in the fraud detection server device, by a fraud detection processor, detecting on the result of the search whether or not the unauthorized operation is present and transmitting a fraud detection result to the user terminal device; and
- a fraud measure operation step of, in the fraud detection server device, by the web browser processor of the user terminal device, performing a predetermined fraud measure operation based on the fraud detection result.

10. The fraud detection method according to claim 9, wherein after the fraud detection script acquisition step, the web content is changed such that the web browser processor is prevented from receiving an input of information related to authentication from the user based on the fraud detection script.

11. The fraud detection method according to claim 9, wherein the detection target data is a tag and attribute information on the tag in a markup language.

12. The fraud detection method according to claim 9, wherein the detection target data is text related to the authentication processing.

13. The fraud detection method according to claim 9, wherein before the content transmission step, the fraud detection method includes:
- a secure communication establishment step of establishing secure communication between the web server device and the user terminal device; and
- a first authentication step of performing first authentication processing between an authentication processor of the web server device and an authentication processor of the user terminal device.

14. The fraud detection method according to claim 9, wherein after the search result transmission step or the fraud detection step, the fraud detection method includes: a log recording step of, by a log recorder of the fraud detection server device, recording at least any one of the result of the search transmitted from the user terminal device and a result of the detection by the fraud detection processor.

15. The fraud detection method according to claim 9, wherein before the content transmission step, the fraud detection method includes: an obfuscation step of, by an obfuscation of the web server device, obfuscating the call script.

16. A fraud detection method in a fraud detection network system in which a web server device transmits a question that is randomly selected from combinations of a plurality of questions previously allocated for each user and correct answers therefor, in which the correct answer is returned from a user terminal device that is connected with a network such that authentication processing is performed, in which a service is thereafter provided and in which a fraud detection server device connected to the network detects an unauthorized operation in the user terminal device, the fraud detection method comprising at least:
- a content transmission step of, after secure communication with the user terminal device is established, by a communication portion of the web server device, transmitting, to the user terminal device, web content information used for the provision of the service including a fraud detection script;
- a content reception step of, in the user terminal device, after secure communication with the web server device is established, by a web browser, receiving the web content information including the call script;
- a search result transmission step of, in the user terminal device, by a web browser processor, searching detection target data included in the web content information based on the fraud detection script and transmitting a result of the search to the fraud detection server device;
- a fraud detection step of, in the fraud detection server device, by a fraud detection processor, detecting on the result of the search whether or not the unauthorized operation is present and transmitting a fraud detection result to the user terminal device; and
- a fraud measure operation step of, in the fraud detection server device, by the web browser processor of the user terminal device, performing a predetermined fraud measure operation based on the fraud detection result.

* * * * *